US010065250B2

(12) United States Patent
Oguri

(10) Patent No.: US 10,065,250 B2
(45) Date of Patent: Sep. 4, 2018

(54) DRILL AND METHOD OF DRILLING A HOLE

(71) Applicants: KURITAKOKI CO., LTD., Aichi (JP); UTSUNOMIYA SEISAKUSHO CO., LTD., Tokyo (JP)

(72) Inventor: Hideki Oguri, Nagoya (JP)

(73) Assignees: Kuritakoki Co., Ltd., Aichi (JP); Utsunomiya Seisakusho Co., Ltd., Tokyo (JP)

( * ) Notice: Subject to any disclaimer, the term of this patent is extended or adjusted under 35 U.S.C. 154(b) by 0 days.

(21) Appl. No.: 15/117,607

(22) PCT Filed: Feb. 10, 2014

(86) PCT No.: PCT/JP2014/053031
§ 371 (c)(1),
(2) Date: Aug. 9, 2016

(87) PCT Pub. No.: WO2015/118684
PCT Pub. Date: Aug. 13, 2015

(65) Prior Publication Data
US 2016/0346846 A1    Dec. 1, 2016

(51) Int. Cl.
*B23B 35/00* (2006.01)
*B23B 51/00* (2006.01)
*B23B 51/10* (2006.01)

(52) U.S. Cl.
CPC .......... *B23B 51/009* (2013.01); *B23B 51/10* (2013.01); *B23B 35/00* (2013.01); *B23B 2215/04* (2013.01);
(Continued)

(58) Field of Classification Search
CPC .......... B23D 2277/00; B23D 2277/20; B23D 2277/201; B23D 2277/204;
(Continued)

(56) References Cited

U.S. PATENT DOCUMENTS 1,418,485 A * 6/1922 Smith .................. B23B 51/009
                                                    279/89
1,643,679 A * 9/1927 Roderick ............... B23B 51/08
                                                    408/223
(Continued)

FOREIGN PATENT DOCUMENTS

DE         1041324     10/1958
DE      102004007950    9/2005
(Continued)

OTHER PUBLICATIONS

International Search Report dated Mar. 18, 2014 in International (PCT) Application No. PCT/JP2014/053031.
(Continued)

*Primary Examiner* — Nicole N Ramos
(74) *Attorney, Agent, or Firm* — Wenderoth, Lind & Ponack, L.L.P.

(57) ABSTRACT

A drill includes a shank and a body having an outer peripheral surface with a certain outer diameter and a distal end tapered surface of a certain distal end angle. The drill includes a pilot shaft portion projecting from the distal end tapered surface of the body and having a diameter smaller than the body and having an outer peripheral surface of a certain outer diameter. The drill further includes an odd number of twisted grooves extending from the outer peripheral surface of the body to the outer peripheral surface of the pilot shaft portion at a certain twisted angle, an odd number of main cutting edges formed on the distal end tapered surface of the body by forming of the twisted grooves, and an odd number of auxiliary cutting edges formed on the distal end tapered surface of the pilot shaft portion by forming of the twisted grooves.

1 Claim, 19 Drawing Sheets

(52) U.S. Cl.
CPC ..... *B23B 2222/04* (2013.01); *B23B 2251/202* (2013.01)

(58) Field of Classification Search
CPC .......... B23D 2277/82; B23B 2251/202; B23B 2251/242; B23B 2251/14; B23B 2251/18; B23B 2251/54; B23B 2251/60; B23B 2251/603; B23B 2251/606; B23B 35/00
See application file for complete search history.

(56) References Cited

U.S. PATENT DOCUMENTS

| | | | | |
|---|---|---|---|---|
| 1,747,117 | A * | 2/1930 | Klein | B23B 51/009 408/223 |
| 3,564,945 | A * | 2/1971 | Bradley | B23B 51/009 408/224 |
| 4,411,563 | A * | 10/1983 | Moon | B23B 51/02 407/54 |
| 4,997,319 | A * | 3/1991 | Arai | B23B 35/005 408/17 |
| 5,199,830 | A * | 4/1993 | Otani | B23Q 3/002 408/67 |
| 5,288,183 | A * | 2/1994 | Chaconas | B23B 51/02 408/211 |
| 7,134,817 | B2 * | 11/2006 | Kado | B23Q 11/0046 409/137 |
| 2002/0168236 | A1 | 11/2002 | Slaughter | |
| 2003/0022013 | A1 * | 1/2003 | Japp | B23B 35/00 428/626 |
| 2006/0056930 | A1 * | 3/2006 | Rompel | B23B 51/02 408/225 |
| 2007/0256298 | A1 * | 11/2007 | Reinhold | B23Q 17/22 29/729 |
| 2009/0214308 | A1 * | 8/2009 | Redfern | B23B 35/005 408/1 R |
| 2009/0279965 | A1 * | 11/2009 | Soittu | B23B 51/02 408/59 |
| 2011/0135413 | A1 * | 6/2011 | Hobohm | B23D 77/00 408/1 R |
| 2013/0136552 | A1 | 5/2013 | Ono et al. | |
| 2014/0086697 | A1 * | 3/2014 | Kakimoto | B23B 51/009 407/115 |
| 2014/0356088 | A1 * | 12/2014 | Santamarina | B23B 51/02 408/144 |

FOREIGN PATENT DOCUMENTS

| | | | | |
|---|---|---|---|---|
| EP | 0545826 | A1 * | 6/1993 | ........... B23D 77/006 |
| EP | 2826580 | A1 * | 1/2015 | ........... B23B 31/008 |
| GB | 2074060 | A * | 10/1981 | ........... B23B 47/287 |
| JP | 52-156495 | | 12/1977 | |
| JP | 63-41408 | | 3/1988 | |
| JP | 04-035812 | | 3/1992 | |
| JP | 6-17814 | | 3/1994 | |
| JP | 2001018106 | A * | 1/2001 | |
| JP | 2006-110704 | | 4/2006 | |
| JP | 2006-205272 | | 8/2006 | |
| JP | 2009034735 | A * | 2/2009 | ........... B23B 51/00 |
| JP | 2012-214943 | | 11/2012 | |
| JP | 2013-111733 | | 6/2013 | |

OTHER PUBLICATIONS

Extended European Search Report dated Aug. 21, 2017 in corresponding European Patent Application No. 14881549.1.

* cited by examiner

X1-X1

Y1-Y1

X2-X2

Y2-Y2

DRILL AND METHOD OF DRILLING A HOLE

TECHNICAL FIELD

The technology described in this specification relates to a drill appropriate for drilling a deep hole in a thick plate member and drilling a hole in overlapped plates and a method of drilling a hole with such a drill.

BACKGROUND ART

In manufacturing an aircraft, for example, many holes are formed manually in a constructional member made of high hardness aluminum alloy used for aircrafts or in overlapped plates having a great thickness. In such a process, a two-edge stepped double margin drill is used as a drill. The two-edge double margin drill has a configuration as described in Japanese Unexamined Patent Application Publication No. 2006-205272 and has two margins. According to such a configuration, an inner peripheral surface of an obtained hole has high smoothness and holes are processed with high accuracy. Such a two-edge stepped double margin drill includes a drill having a small diameter at a distal end thereof. In processing a material for aircrafts, occurrence of cutting distortion is strictly required to be eliminated. The cutting margin generated via one performance of a process of drilling a hole is necessarily set small so that a diameter of the hole can be gradually increased. The cutting margin corresponds to difference between an outer peripheral dimension of a distal end side small diameter portion of the stepped drill and an outer peripheral dimension of a basal end side large diameter portion.

Problem to be Solved by the Invention

However, the two-edge stepped double margin drill performs cutting with only two cutting edges. Therefore, cutting resistance is large and the cutting margin obtained via one performance of the drilling process cannot be set great. Therefore, a large number of performances of the drilling process is required until a desired hole diameter is obtained. As the cutting resistance is greater, the abrasion loss of the cutting edge is greater. Therefore, life of the tool is shortened and the number of holes that can be drilled with one drill is small.

Further, the two-edge drill has two twisted grooves for chip evacuation. The twisted grooves are necessarily deep to evacuate a predetermined volume of chips and a substantial web thickness is decreased. Accordingly, rigidity of the drill is lowered and the drill may be deformed or distorted in processing a deep hole and the deep hole may be likely to be slightly curved. Further, in processing aluminum alloy, cut chips are elongated and may be accumulated in the twisted grooves of the two-edge drill and the accumulated chips may damage an inner peripheral surface of the hole or a surface of the workpiece or a large burr may be generated on the workpiece. Thus, hole processing precision is lowered.

A three-edge drill may be used to solve the above problems. However, it is not common sense in selecting a tool for those having skills in the art to use a three-edge drill to process a high-hardness workpiece made of aluminum alloy. The three-edge drill includes a chisel portion having an area greater than that of the two-edge drill. A drill has a chisel portion at a distal end thereof where no cutting edge is formed. According to such a configuration, the three-edge drill has inferior biting performance with respect to a workpiece and thus, precision of positioning the holes to be processed is lowered or the drill may enter the workpiece with being tilted. Aluminum alloy has a thermal expansion coefficient greater than iron steel and therefore, the chips are necessarily evacuated smoothly. However, the twisted grooves for the chip evacuation are less likely to have effective depth in the three-edge drill and the chip evacuation performance is deteriorated. Such problems are caused not only in forming a hole in the aluminum alloy for aircrafts but also in drilling a hole in high-hardness metal.

RELATED ART DOCUMENT

Patent Document

Patent Document 1: Japanese Unexamined Patent Application Publication No. 2006-205272

DISCLOSURE OF THE PRESENT INVENTION

This specification describes a drill that is applied for a process of drilling a hole in overlapped plates or thick material with reducing the number of process steps in a drilling process until obtaining a desired hole diameter. The drill has a long tool life and excellent processing accuracy.

Means for Solving the Problem

A drill described in this specification includes a shank and a body that is continuous from the shank, and the body has an outer peripheral surface with a certain outer diameter and a distal end tapered surface of a certain distal end angle. The drill includes a pilot shaft portion projecting from the distal end tapered surface of the body and having a diameter smaller than the body and having an outer peripheral surface of a certain outer diameter, the pilot shaft portion and the body being concentric, and the pilot shaft portion including a shaft main body portion, a distal end flat surface that is at a distal end of the shaft main body portion, and a distal end tapered surface that is between an outer peripheral surface of the shaft main body portion and the distal end flat surface and has a certain distal end angle. The drill further includes an odd number of twisted grooves extending from the outer peripheral surface of the body to the outer peripheral surface of the pilot shaft portion at a certain twisted angle, an odd number of main cutting edges formed on the distal end tapered surface of the body by forming of the twisted grooves, and an odd number of auxiliary cutting edges formed on the distal end tapered surface of the pilot shaft portion by forming of the twisted grooves.

Advantageous Effect of the Invention

The drill disclosed in this specification can be used for drilling a hole in overlapped plates and thick material with reducing the number of process steps in the drilling process until obtaining a desired hole diameter, and a drill and a method of drilling a hole in overlapped plates with long tool life and excellent process accuracy can be provided.

MODE FOR CARRYING OUT THE INVENTION

First Embodiment

Figure 1:
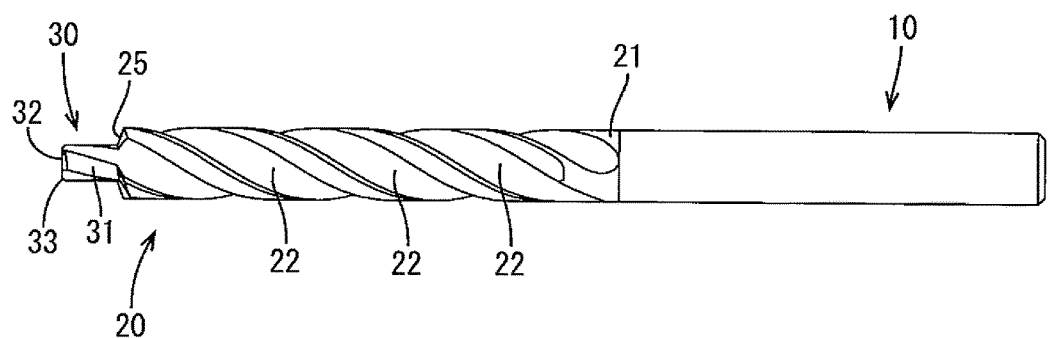
FIG. 1 is a side view of a drill (first embodiment).
Figure 2:
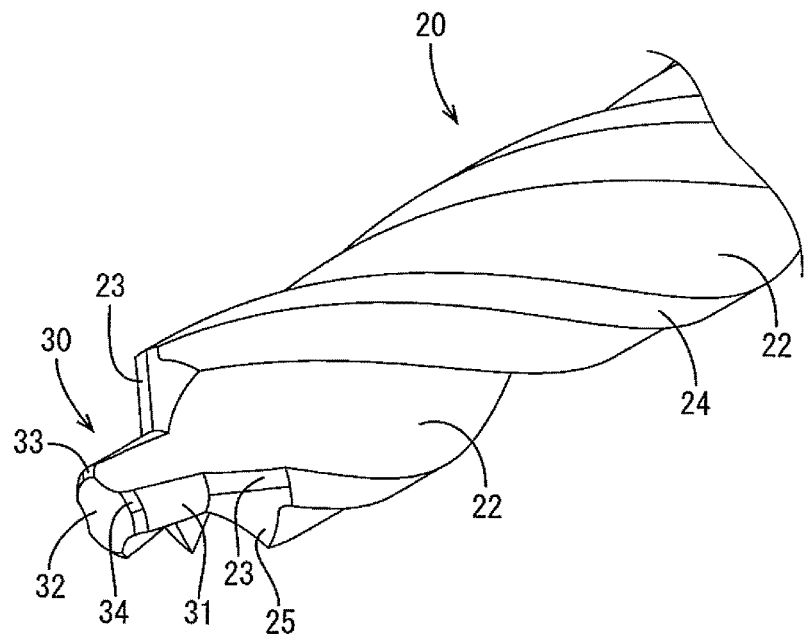
FIG. 2 is a perspective view of a distal end portion of the drill (first embodiment).
Figure 3:
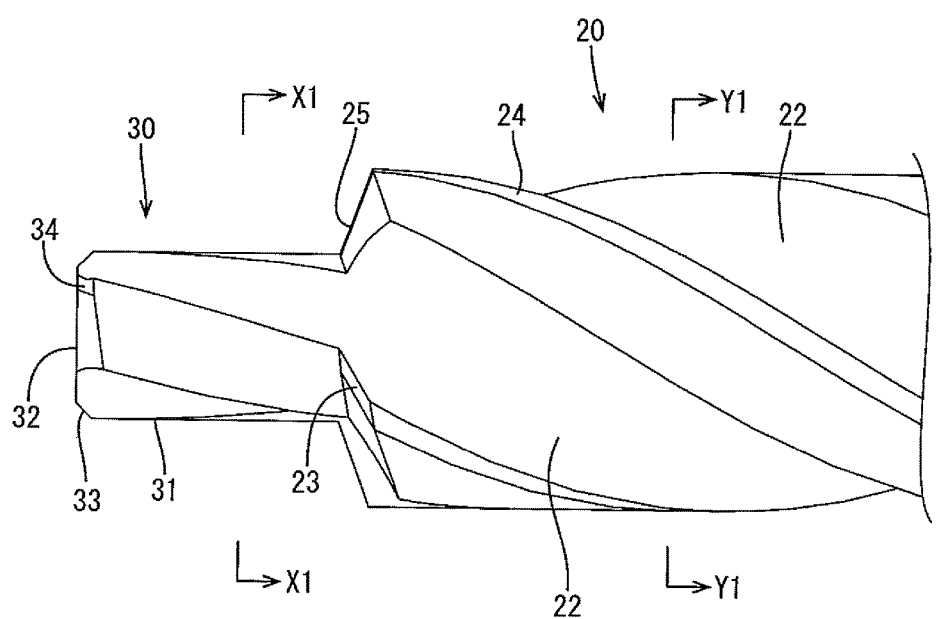
FIG. 3 is an enlarged side view of the distal end portion of the drill (first embodiment).
Figure 4:
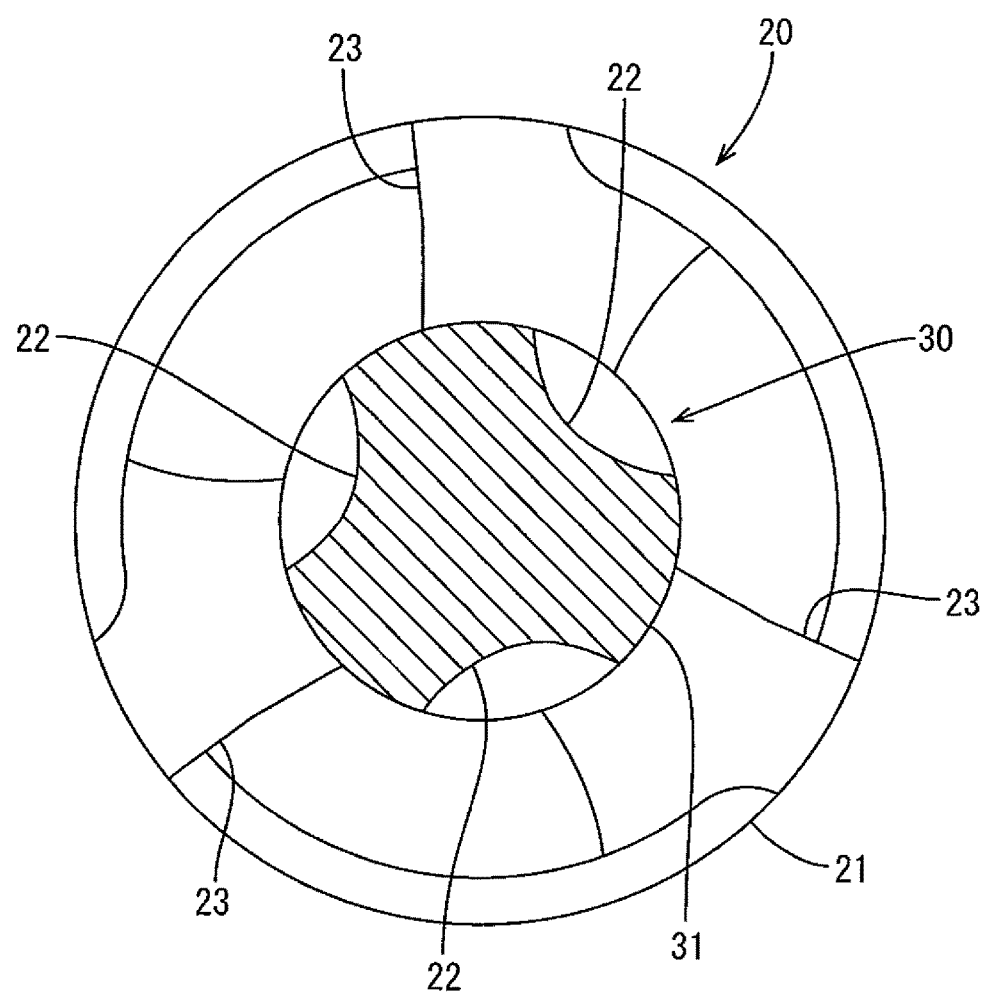
FIG. 4 is a cross-sectional view taken along line X1-X1 in FIG. 3 (first embodiment).
Figure 5:
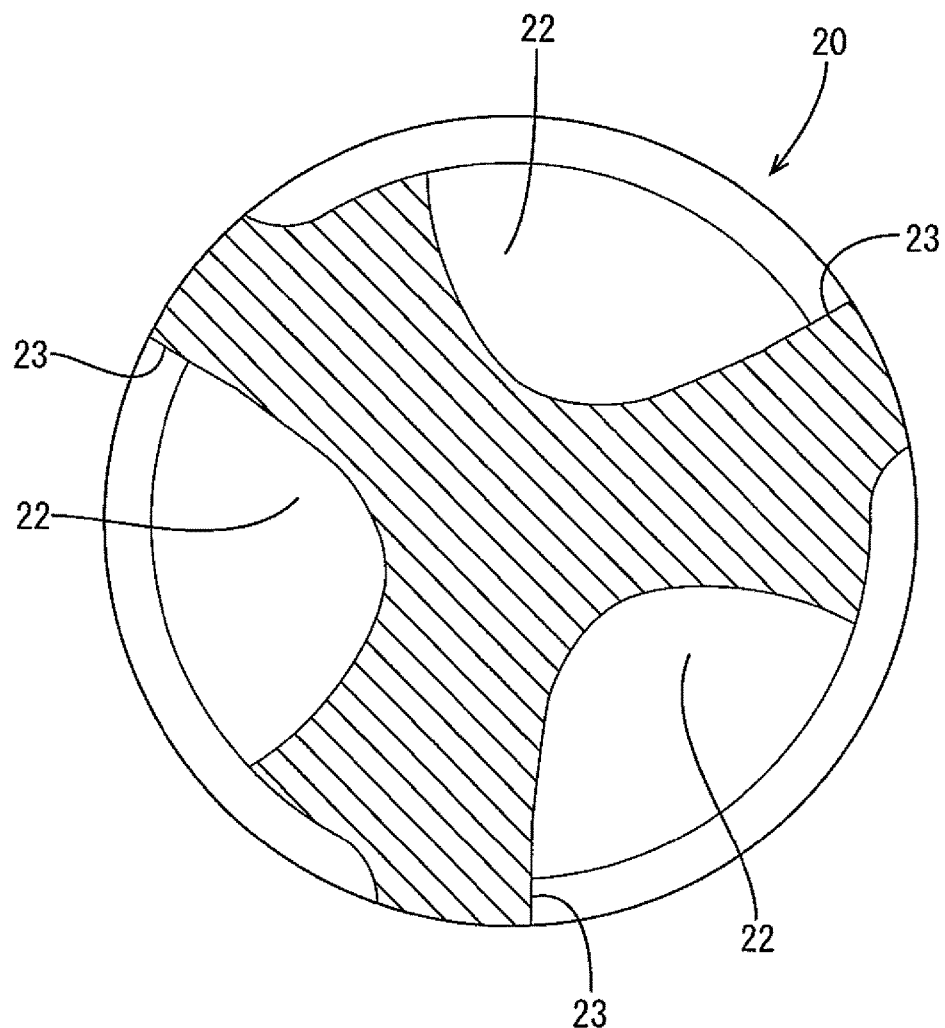
FIG. 5 is a cross-sectional view taken along line Y1-Y1 in FIG. 3 (first embodiment).

A drill according to a first embodiment will be described. The drill includes a pilot shaft portion that projects from a distal end tapered surface of a body and has a diameter smaller than that of the body. The pilot shaft portion and the body are concentric. The pilot shaft portion includes a shaft main body, a distal end flat surface, and a distal end tapered surface. The shaft main body includes the distal end flat surface at a distal end thereof. The distal end tapered surface is between an outer peripheral surface of the shaft main body and the distal end flat surface and a certain angle is between the tapered surface and the distal end flat surface. A body and the pilot shaft portion include an odd number of twisted grooves (three or five twisted grooves) on outer peripheral surfaces of the body and the pilot shaft portion at a certain twisted angle. As a result of the formation of the twisted grooves, the distal end tapered surface of the body has an odd number of main cutting edges and the distal end tapered surface of the pilot shaft portion has the same number of auxiliary cutting edges as that of the main cutting edges of the distal end tapered surface of the pilot shaft portion.

In the drill having the odd number of main cutting edges, for example, three edges are disposed at an angle interval of 120 degrees and occurrence of deflection is less than that in the drill having an even number of edges such as two and thus, substantially an exact circle is formed with high accuracy. Further, the number of twisted grooves that are evacuation paths for chip evacuation is increased and the depth of the twisted grooves can be small. Therefore, the body can have great shaft rigidity and less deformation or distortion and the drill has improved rectilinearity. Therefore, a deep hole can be drilled with improved rectilinearity. In the conventional two-edge margin drill, an elongated cut chip is generated in drilling a workpiece made of high-hardness metal. Even if a workpiece is made of high-hardness metal such as aluminum alloy used for aircrafts, the chips are cut into small pieces and evacuated in the three-edge drill. Therefore, an inner peripheral surface of the hole is less likely to be damaged by the cut chips and this improves hole drilling accuracy.

Further, the drill having the odd number of main cutting edges includes a greater number of main cutting edges than the conventional two-edge double margin drill and executes cutting operation effectively. Therefore, an expansion margin of a hole diameter to be expanded from the prepared hole is increased and the number of process steps for obtaining a desired hole diameter is reduced. Further, the abrasion amount of the main cutting edge per one performance is decreased and therefore, the number of holes to be processed with one drill is greatly increased.

Such a multiple-edge drill having three or more edges has superior cutting performance than the two-edge double margin drill. However, the multiple-edge drill may have inferior biting performance with respect to a high hardness workpiece and positioning accuracy in drilling a hole may be deteriorated. However, the drill according to the present embodiment includes a distal end portion that is a flat surface of the pilot shaft portion. Therefore, unlike the stepped drill, the drill of this embodiment cannot perform a first performance of directly drilling a hole but require a process of forming a prepared hole. Accordingly, the two-edge drill having good biting performance is used for a drill for forming a prepared hole and the prepared hole is formed with high positioning accuracy. The drill of this embodiment includes the pilot shaft portion at the distal end thereof and the pilot shaft portion is inserted in the prepared hole that is previously formed with high accuracy and performs a drilling operation. Therefore, high positioning accuracy of a hole that is finally formed is maintained.

In such a drill, the pilot shaft portion includes a distal end angle that is preferably similar to that of the body. According to such a configuration, a drill is easily manufactured. The distal end angle of the distal end tapered surface of the pilot shaft portion is most preferably 60 degrees or more.

In processing a hole in overlapped plates including multiple plates, the hole is formed as follows with using the above drill. First, a prepared hole of a predetermined diameter is formed in the overlapped plates, or a workpiece (a prepared hole forming process). In the process, it is preferable to use a drill with good biting performance such as a two-edge drill instead of the drill of the present embodiment. With the two-edge drill, a prepared hole can be formed with high positioning accuracy. In the prepared hole forming process, burrs may be generated on a drill exit side surface of each of the overlapped plates. Therefore, a burring process is executed and the overlapped plates are separated from each other and burrs are removed from each of the plates in the burring process. Each of the plates from which the burrs are removed is mounted on each other and overlapped plates where two prepared holes on an upper side and a lower side are communicated with each other (a re-overlapping process) are provided again. Then, the pilot shaft portion of the drill of this embodiment is inserted in the prepared hole in the re-mounted plates and the hole is expanded with the main cutting edges formed on the body (a hole expansion process). If the positions of the plates are displaced from each other due to a mounting error that may be caused in the re-overlapping process, the inner peripheral surfaces of the prepared holes in the respective plates may be displaced and steps are formed. The pilot shaft portion of the drill of this embodiment includes auxiliary cutting edges on a distal end tapered surface and the auxiliary cutting edges are continuous to the respective twisted grooves. The stepped inner peripheral surfaces of the prepared holes are cut with the auxiliary cutting edges and the cut chips are smoothly evacuated via the twisted grooves. As a result, the insertion of the pilot shaft portion through the prepared holes and the hole drilling with the main cutting edges of the body are not adversely affected and the hole drilling performance is completed without stopping an operation during the performance.

After the execution of the hole expansion process with the drill of this embodiment, the burring process and the re-overlapping process are executed repeatedly. The obtained hole, which is a prepared hole, is expanded step by step by executing the hole expansion process repeatedly with using a thicker drill and a hole of a desired dimension is obtained.

Figure 6:
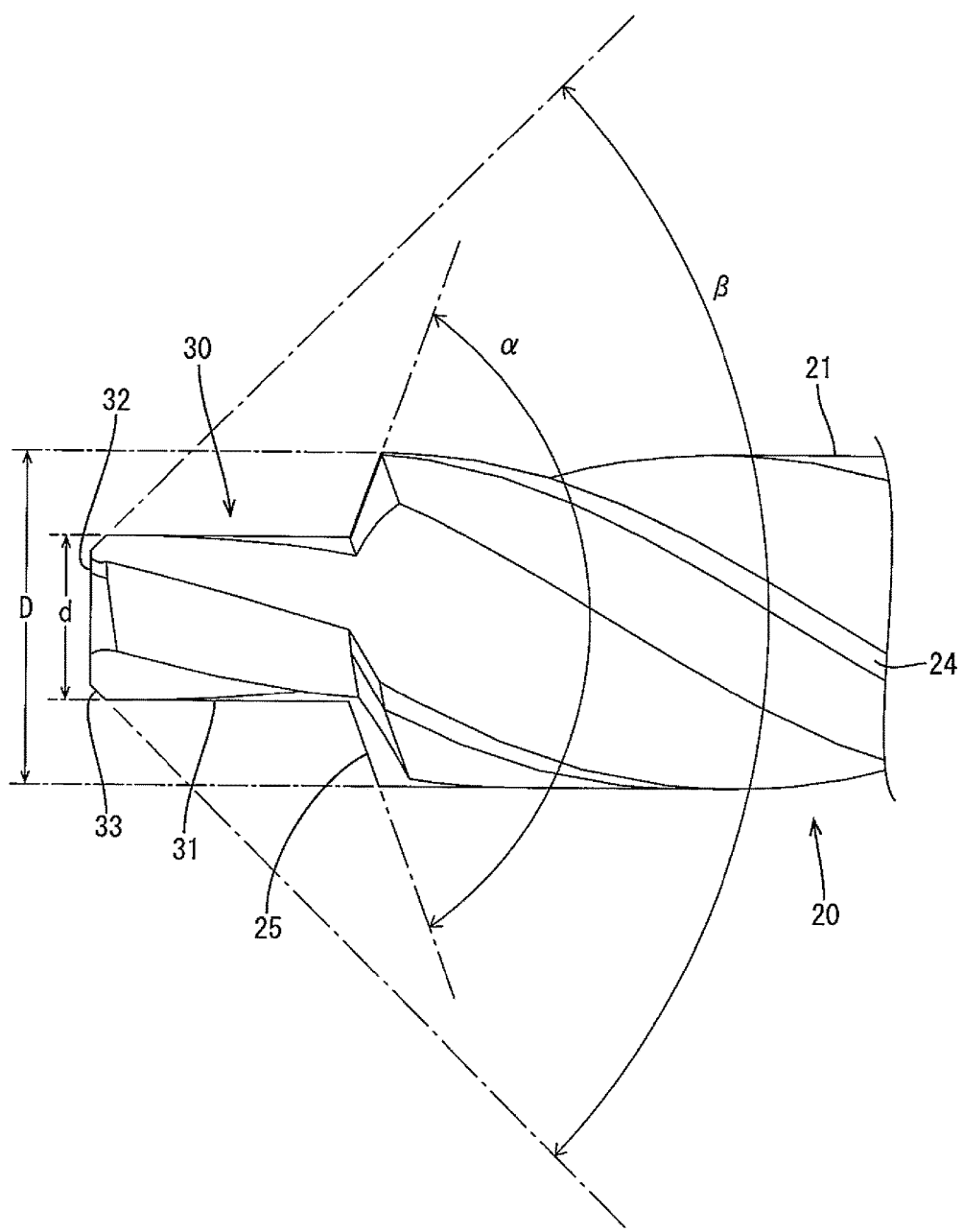
FIG. 6 is an enlarged side view of the distal end portion of the drill.

Next, a drill according to a first embodiment and a method of drilling a hole in overlapped plates with using the drill will be described in detail. The drill according to this embodiment is manufactured by cutting a round bar made of steel or hard metal alloy, and includes a shank 10 and a body 20 that is continuous from the shank 10. As illustrated in FIG. 6, the body 20 has an outer peripheral surface 21 having an outer diameter D (for example, 7.8 mm) and distal end tapered surfaces 25 having a certain distal end angle α.

A pilot shaft portion 30 projects from the distal end tapered surfaces 25 of the body 20 and is on the distal end of the body 20. The pilot shaft portion 30 and the body 20 are concentric. As illustrated in FIG. 6, the pilot shaft portion 30 includes a shaft main body portion 31, a distal end flat surface 32, and distal end tapered surfaces 33. The shaft main body portion 31 has a right circular cylindrical shape having an outer peripheral surface of an outer diameter d and has a basal end portion that is integrally continuous from the distal end tapered surfaces 25 of the body 20. The distal end flat surface 32 is at a distal end of the shaft main body portion 31. The distal end tapered surfaces 33 are between the outer peripheral surface of the shaft main body portion 31 and the distal end flat surface 32. The distal end tapered surfaces 33 have a distal end angle β (see FIG. 6) that is 90 degrees in this embodiment. The distal end angle β may be preferably 60 degrees or more with considering cutting performance. The distal end angle β may be preferably set substantially same as the distal end angle α of the distal end tapered surfaces 25 for facilitating production of the drill.

The body 20 includes an odd number of, for example three, twisted grooves 22 on an outer peripheral surface thereof with a certain lead (for example, 42 mm), a twisted angle (for example, 30 degrees), and a groove length (for example, 70 mm). Each of the distal end tapered surfaces 25 continues from the outer peripheral surface of the body 20 to the basal end portion of the shaft main body portion 31 of the pilot shaft portion 30. The distal end tapered surface 25 extends in a ring shape to surround the basal end portion of the shaft main body portion 31. The tapered surfaces 25 include three tapered surfaces 25 by forming of the twisted grooves 22. The tapered surfaces 25 have the certain distal end angle α (see FIG. 6) and are tapered toward the distal end. In this embodiment, the distal end angle α is 118 degrees, for example, however, any other appropriate value is set with considering strength and cutting efficiency of the drill. Each of the tapered surfaces 25 includes a main cutting edge 23 for each twisted groove 22. Three main cutting edges 23 are formed on the respective tapered surfaces 25. Margins 24 are formed along the respective twisted grooves 22 and an outer diameter D of the body 20 is determined by the margins 24. The outer diameter D of the body 20 corresponds with an outermost peripheral surface of the body 20.

Each of the twisted grooves 22 continues from the outer peripheral surface of the body 20 to the outer peripheral surface of the pilot shaft portion 30 and the outer peripheral surface of the pilot shaft portion 30 is cut to form the twisted grooves 22. Therefore, the distal end tapered surfaces 33, which surround the outer periphery of the distal end flat surface 32 of the pilot shaft portion 30 in a ring-shape, include three distal end tapered surfaces 33. Accordingly, three auxiliary edges 34 are formed on the distal end tapered surfaces 33 of the pilot shaft portion 30 near the three twisted grooves 22, respectively. Each of the auxiliary edges 34 has a cutting margin of 0.3 mm, for example. The cutting margin of the auxiliary edges 34 is freely set. However, if the auxiliary edges 34 have a large cutting margin, an effective axial dimension of the pilot shaft portion 30 is reduced and guiding performance of the pilot shaft portion 30 is deteriorated.

Figure 7:
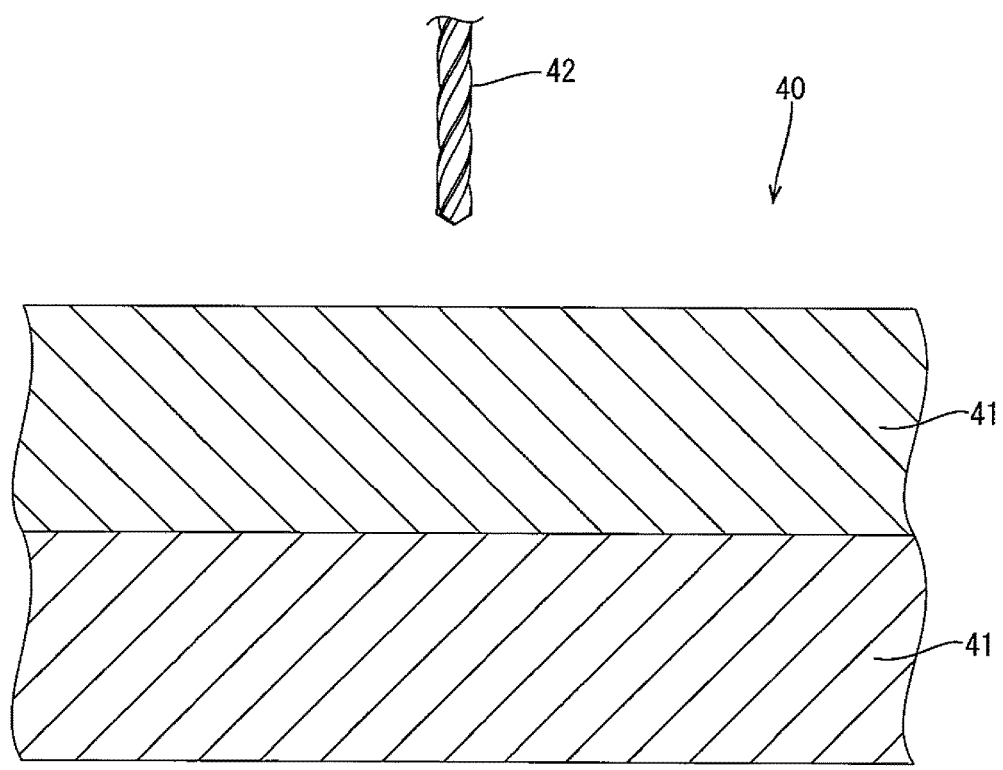
FIG. 7 is a cross-sectional view illustrating overlapped plates in a process of forming a prepared hole in a method of drilling a hole using the drill according to the first embodiment (first embodiment).
Figure 8:
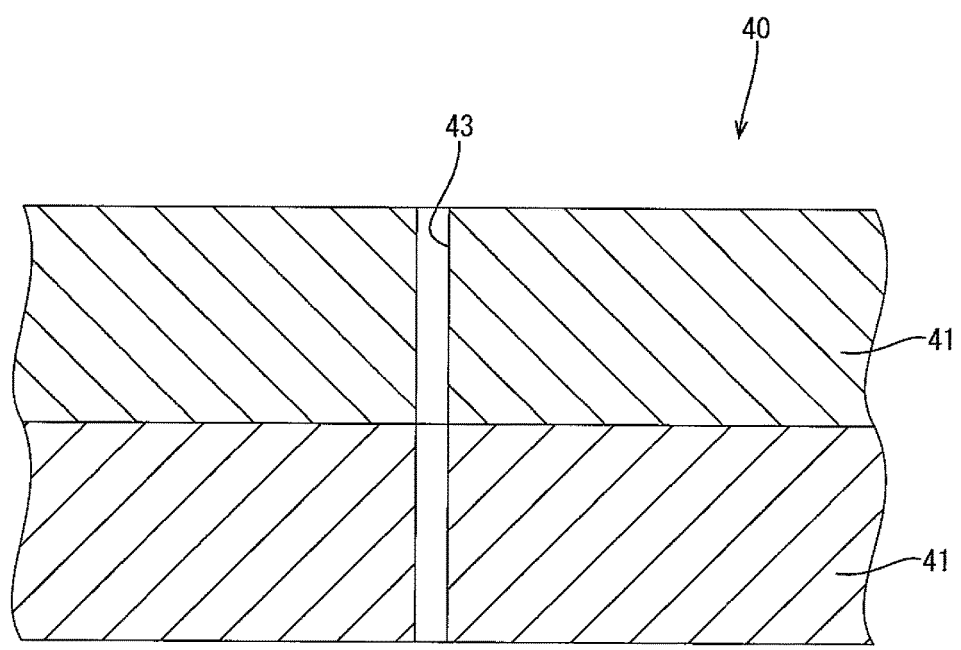
FIG. 8 is a cross-sectional view illustrating the overlapped plates after completion of the process of drilling a prepared hole (first embodiment).

Next, a method of drilling a hole in overlapped plates 40 made of high hardness aluminum alloy for aircrafts will be described. The overlapped plates 40 illustrated in FIG. 7 include two single plates 41 that are layered to be closely in contact with each other and connected via a bolt (not illustrated). First, a prepared hole 43 having a certain dimension is drilled in the overlapped plates 40 with the drill 42 for drilling a prepared hole as illustrated in FIG. 8 (the prepared hole forming process). A two-edge drill that is likely to bite a workpiece and has good positioning accuracy is preferably used as the drill 42 for drilling a prepared hole.

Figure 9:
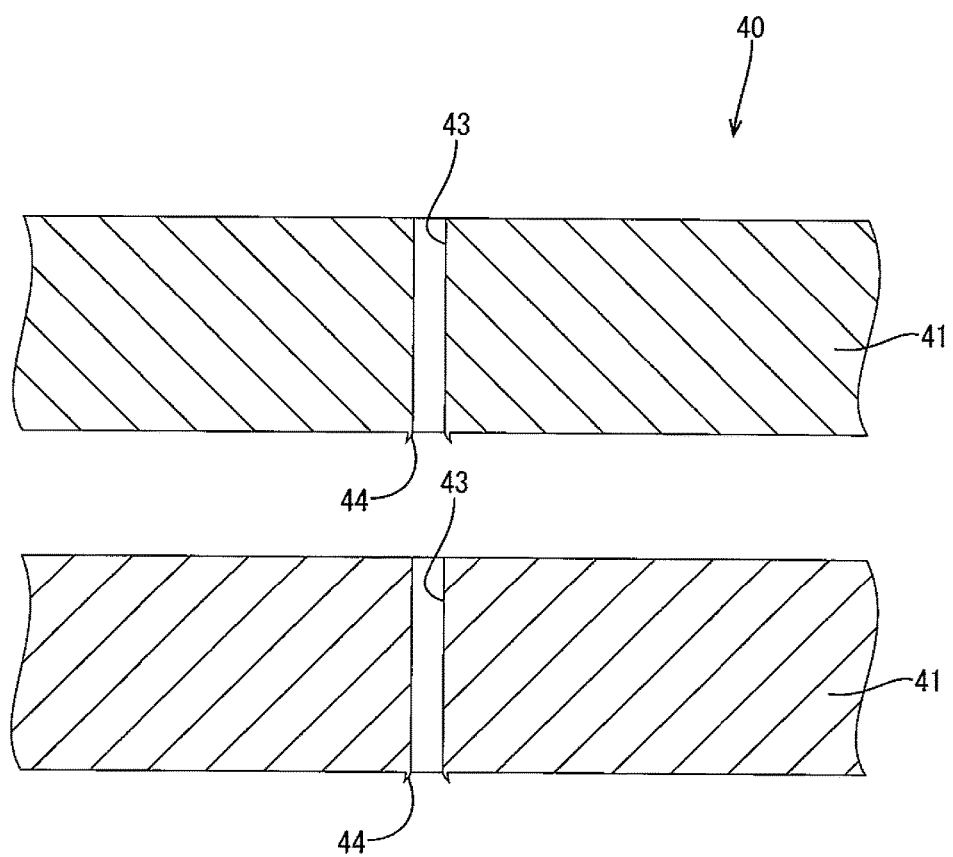
FIG. 9 is a cross-sectional view illustrating the overlapped plates during a process of removing burrs (first embodiment).
Figure 10:
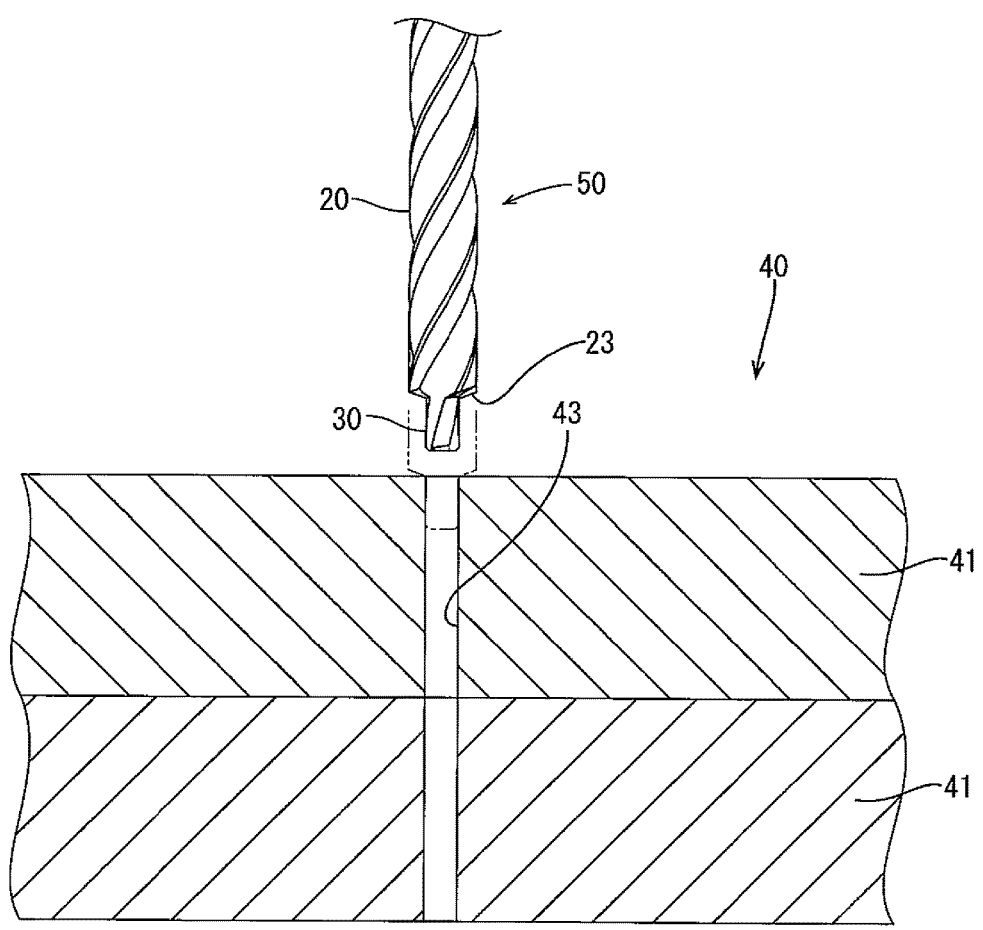
FIG. 10 is a cross-sectional view illustrating the overlapped plates during a process of expanding a hole (first embodiment).

The bolt is removed from the overlapped plates 40 and the plates 40 are separated into two single plates 41 as illustrated in FIG. 9. Burrs 44 are removed from each of the single plates 41 with an appropriate tool such as a counter cutter (the burring process). After removing the burrs 44, the single plates 41 are positioned and overlapped with each other so that the prepared holes 43 are communicated with each other again and the single plates 41 are fixed to each other with a bolt (the re-overlap process). Then, as illustrated in FIG. 10, a hole enlarging process is executed with using the drill 50 of this embodiment. The pilot shaft portion 30 of the drill 50 has an outer diameter dimension d that is substantially same as an inner diameter of the prepared hole 43 and the pilot shaft portion 30 is put in the prepared hole 43 to drill a hole. If the drill 50 is pushed into the prepared hole 43 with being rotated, the inner peripheral surface of the prepared hole 43 is cut to have a hole diameter same as the outer diameter dimension of the body 20 with the main cutting edges 23 provided on the distal end of the body 20.

Figure 11:
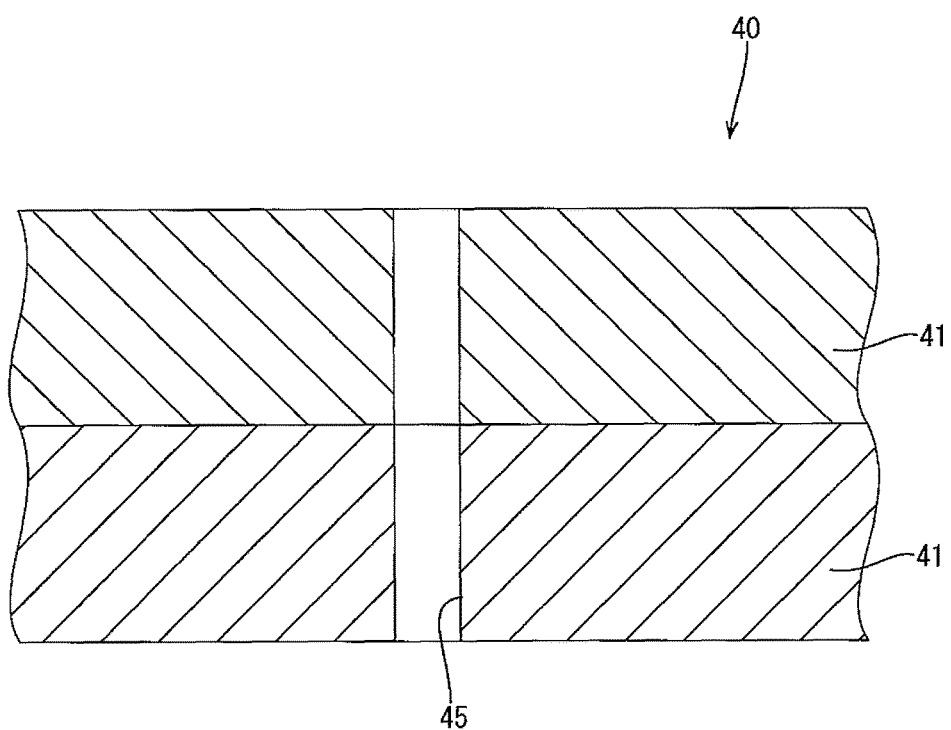
FIG. 11 is a cross-sectional view illustrating the overlapped plates after completion of the process of expanding a hole (first embedment).

A cutting start position of the drill 50 is surely determined by the pilot shaft portion 30 and the drill 50 moves in the drilling direction and is linearly guided by the fitting of the pilot shaft portion 30 and the prepared hole 43. Therefore, as illustrated in FIG. 11, a straight hole 45 is drilled in a correct position. The drill 50 of this embodiment is a three-edge drill including three main cutting edges 23. Therefore, the drill 50 includes the margins 24 at an angle interval of 120 degrees and is supported at three points. Therefore, deflection is less likely to occur in the three-edge drill compared to a two-edge drill. A conventional two-edge double margin drill that has a two-point support structure may be deflected vertically and elongated circular hole is likely to be formed. In this embodiment, substantially an exact circle is formed with high accuracy.

The three twisted grooves 22 that are evacuation paths for chip evacuation are formed and therefore, the depth of the twisted grooves 22 can be decreased. As a result, axial rigidity of the drill 50 is increased and warping is less likely to be caused, and the drill is likely to move straight. Thus, a deep and straight hole can be drilled. Even in drilling a hole in high hardness aluminum alloy, the cut chip is not an elongated one as is generated by the conventional two-edge double margin drill but is cut into pieces and evacuated. Therefore, the inner peripheral surface of the hole 35 is less likely to be damaged by the cut chips and a drilling performance with high accuracy is executed.

Figure 12:
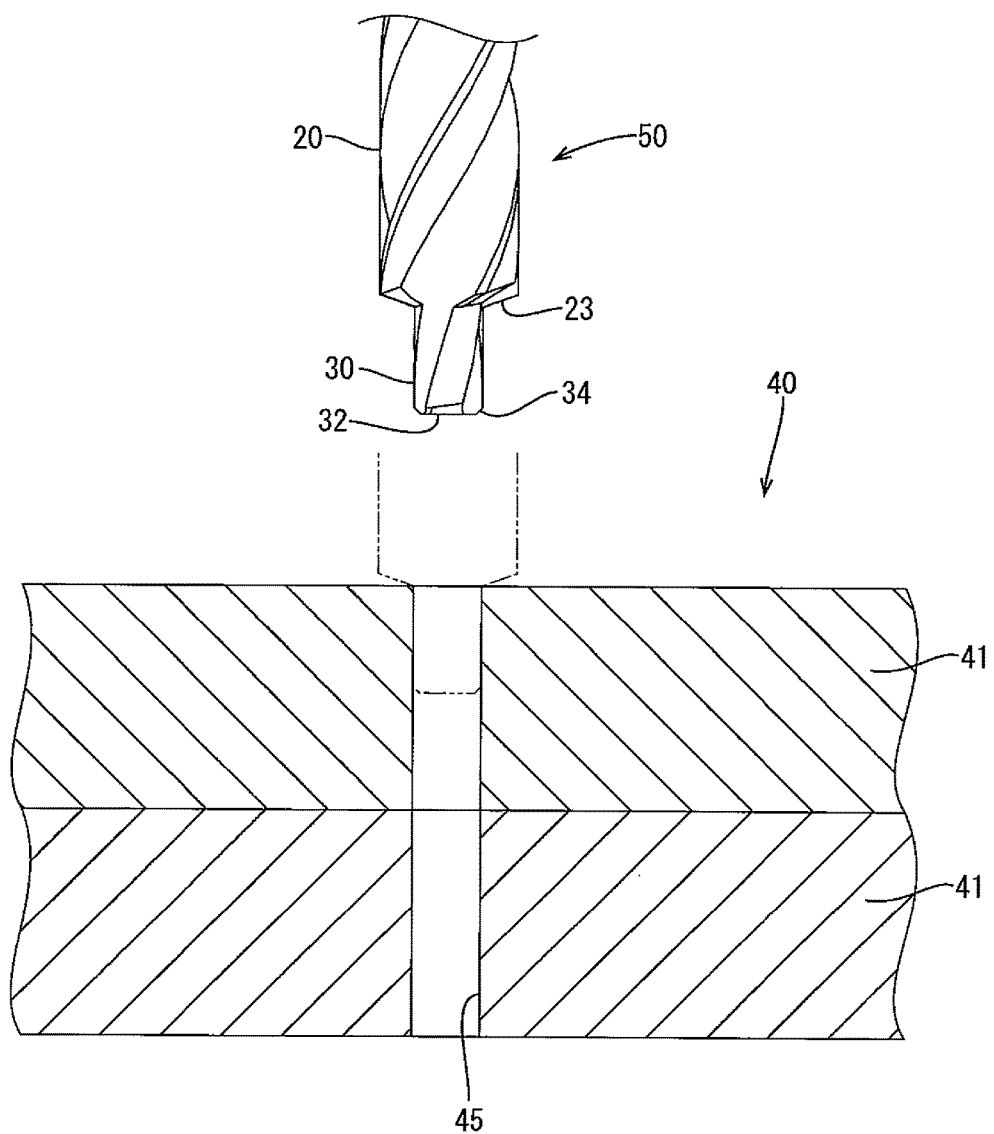
FIG. 12 is a cross-sectional view illustrating the overlapped plates during a second performance of the process of expanding a hole (first embedment).

After the hole 45 is drilled by the drill 50 as described before, the burring process, the re-overlap process, and the hole expansion process are repeated step by step to expand the hole diameter to a desired size. In the hole expansion process, the hole is drilled with a large diameter drill 50 as illustrated in FIG. 12. The drill 50 of this embodiment includes three main cutting edges 23 that are greater in number of edges compared to the conventional two-edge double margin drill. Therefore, cutting is efficiently performed with one drilling performance. As a result, an expansion margin of the hole diameter in each step is increased and therefore, the number of process steps is reduced compared to the conventional one until the desired hole diameter is obtained and the work efficiency is high. In the drill 50 of this embodiment, the number of the main cutting edges 23 is 1.5 times as that of the conventional drill. Therefore, an abrasion amount of the drill 50 per one step is reduced and the number of holes to be processed with one drill is greatly increased.

Figure 13:
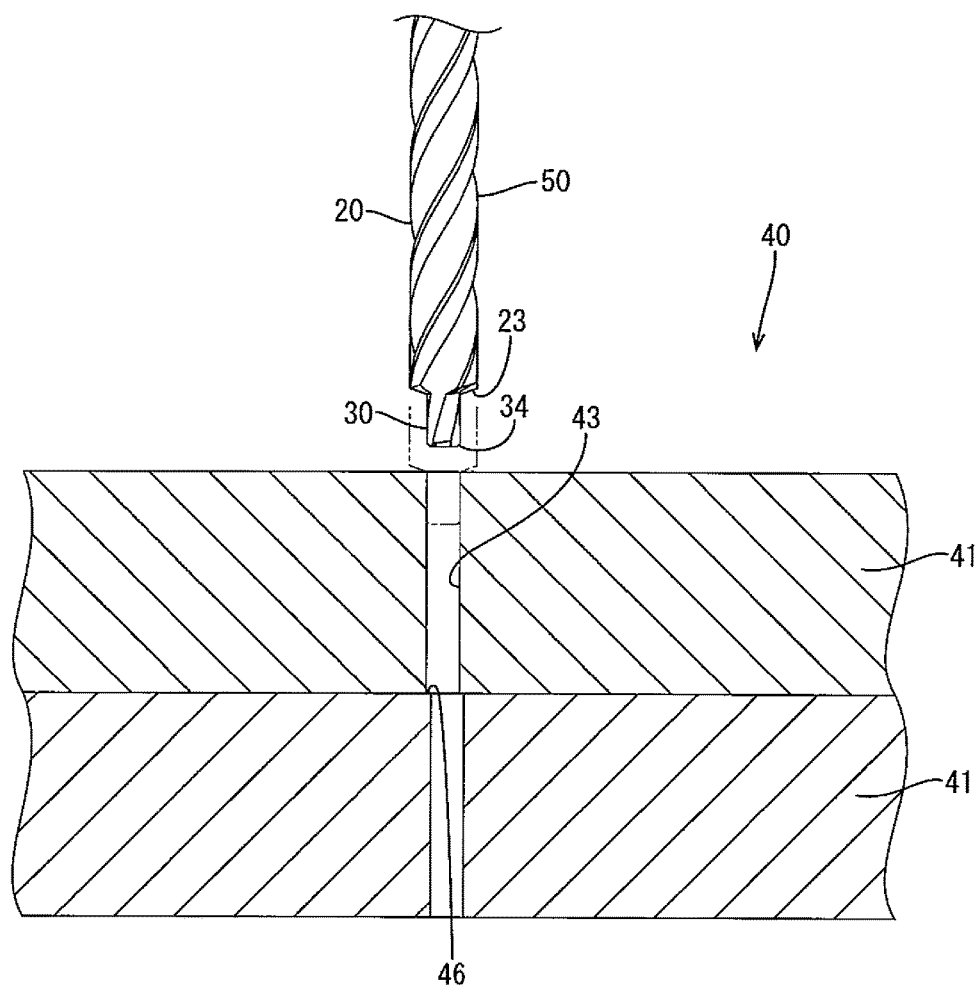
FIG. 13 is a cross-sectional view illustrating that the overlapped plates are displaced from each other during the process of expanding a hole (first embedment).

In the re-overlap process, deflection may be caused in the overlapping positions of the single plates 41 and the inner peripheral surfaces of the prepared holes 43 are displaced from each other and a step may be generated between the inner peripheral surfaces as illustrated in FIG. 13. In the overlapped plates 40 of this embodiment, a mounting error (tolerance) is to be 0.2 mm, for example. If such displacement occurs, the distal end of the pilot shaft portion 30 hits against a step portion 46 generated in the prepared hole 43 and the drill 50 may not move further therefrom without having the auxiliary cutting edges 34 in the pilot shaft portion 30.

In this embodiment, the pilot shaft portion 30 includes the distal end tapered surfaces 33 on the outer peripheral portions of the distal end flat surface 32 and the auxiliary cutting edges 34 are formed on the distal end tapered surfaces 33. Therefore, even if the step portion 46 is generated due to the displacement of the single plates 41, the step portion 46 is cut off with the auxiliary cutting edges 34 and drilling is continued straightly thereafter. The prepared hole forming process, the burring process, the re-overlapping process, and the hole expansion process are executed sequentially on the overlapped plates 40 including single plates 41 overlapped with each other. In the performance of drilling a hole with executing sequentially the processes, the displacement of the single plates 41 is likely to be caused. However, in the present embodiment, the performance of drilling a hole is executed without any problems.

Second Embodiment

A drill according to a second embodiment disclosed in this specification will be described. Similar to the first embodiment, the drill includes a pilot shaft portion projecting from distal end tapered surfaces of a body and an odd number of main twisted grooves are formed on an outer peripheral surface of the body. The pilot shaft portion and the body are concentric. As a result, an odd number of main cutting edges are formed on the distal end tapered surfaces of the body.

Therefore, similar to the first embodiment, the body of the drill of this embodiment has high axial rigidity compared to the two-edge drill. With the drill of this embodiment, a deep and straight hole can be drilled, and even if a workpiece is made of high hardness metal such as aluminum alloy for aircrafts, the inner peripheral surface of the hole is less likely to be damaged by cut chips. Thus, drilling a hole is performed with high accuracy. The cutting performance is high and the number of performance steps until obtaining a desired hole diameter is reduced. A hole is drilled in overlapped plates including multiple plates effectively with the drill of this embodiment.

Further, according to this embodiment, the drill includes auxiliary twisted grooves that are formed by cutting portions each ranging from a bottom portion of each main twisted groove near the distal end portion of the body to an outer peripheral surface of the pilot shaft portion. As a result of forming the auxiliary twisted grooves, the auxiliary cutting edges are formed on the distal end tapered surfaces of the pilot shaft portion and also each of the main cutting edges includes a first main cutting edge and a second main cutting edge. The first main cutting edge is on an outer peripheral side of the body that is formed by forming the main twisted groove. The second main cutting edge is formed by forming the auxiliary twisted groove and is on an inner peripheral side of the body to be continuous from the first main cutting edge. The auxiliary twisted groove is formed by cutting the bottom portion of the main twisted groove and extends along the main twisted groove. Therefore, each of the first main cutting edge and the second main cutting edge has a certain rake angle. Therefore, the first main cutting edge and the second main cutting edge effectively contribute to cutting of a workpiece.

The cutting performance is improved as the over-center amount of the cutting edge of the drill is decreased, and the durability of the cutting edge is increased as the over-center amount is increased. The over-center amount of the main cutting edge is one kind in the drill of the first embodiment, and each of the main cutting edges includes the first main cutting edge and the second main cutting edge having two different over-center amounts in the second embodiment. In the drill of the second embodiment, the second main cutting edge that is on an inner peripheral side of the body and moves at lower rotating speed has a smaller over-center amount than the first cutting edge that is on an outer peripheral side of the body and moves at greater rotating speed.

Figure 14:
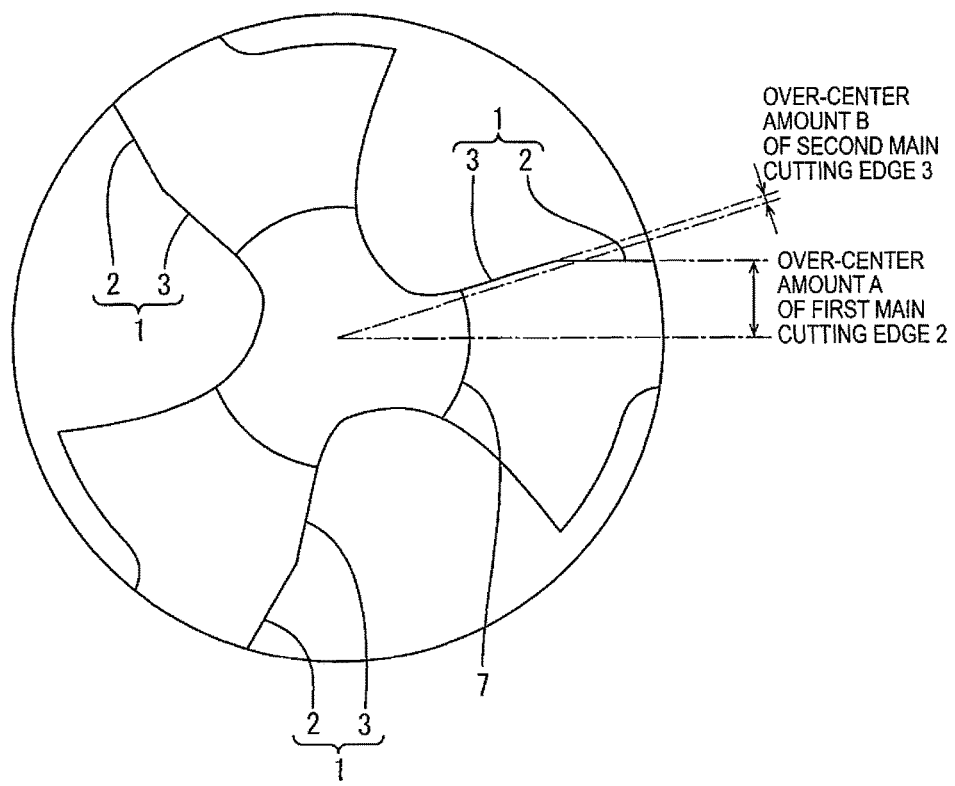
FIG. 14 is a front view illustrating over-center amounts of a main cutting edge of the drill (second embodiment).

Such relation is schematically illustrated in FIG. 14. FIG. 14 is a front view of the drill seen from a distal end side (a pilot shaft portion side) and the main cutting edges are projected on a surface that is perpendicular to a center shaft of the body. A main cutting edge 1 includes a first main cutting edge 2 and a second main cutting edge 3. The first main cutting edge 2 is on an outer peripheral side of the body and the second main cutting edge 3 is on an inner peripheral side of the body. An over-center amount B of the second main cutting edge is smaller than an over-center amount A of the first main cutting edge 2 (A>B). The over-center amount A, B of each cutting edge 2, 3 is defined as a distance between a line extending along an edge of each cutting edge 2, 3 (edge line) and a line passing through a center shaft of the body and parallel to the edge line.

The one body includes two cutting edges 2, 3 having different over-center amounts and therefore, cutting is carried out with the two different kinds of cutting edges at different rotation phases. Thus, application of the cutting resistance is distributed with regard to a position and time and the cutting resistance is less likely to change abruptly. The second cutting edge 3 that is on the inner peripheral side moves at a lower rotating speed, and such a second cutting edge 3 has the over-center amount A smaller than the first cutting edge 2 and has high cutting performance. Therefore, although the second cutting edge 3 is on the inner peripheral side and moves at a lower rotating speed, the main cutting edge 1 as a whole can maintain high cutting performance. Especially in a large-diameter drill including a main cutting edge 1 with an entire length of 1.4 mm or more, the cutting performance is remarkably improved and the cutting resistance is greatly reduced compared to the drill of the first embodiment.

Figure 15:
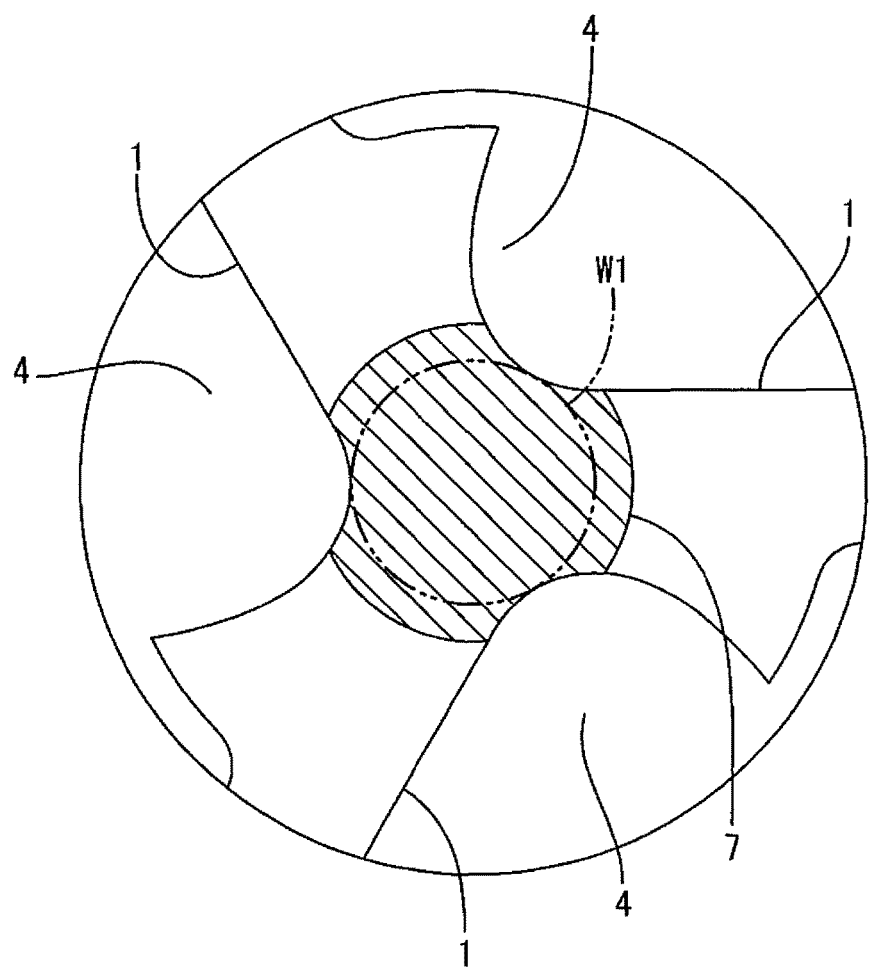
FIG. 15 is a cross-sectional view illustrating a web of the drill according to the first embodiment (first embodiment).

According to the second embodiment, the body has a web (core thickness) greater than the drill of the first embodiment with maintaining the same cutting performance, and reasons thereof will be described with reference to FIGS. 15 and 16. FIG. 15 schematically illustrates a cross section of the body portion of the drill according to the first embodiment including one kind of main cutting edge 1. In the drill of the first embodiment, the main twisted grooves are necessarily formed continuously to the outer peripheral surface of the pilot shaft portion. Therefore, the outer peripheral surface of the pilot shaft portion is partially cut off to form the twisted groove 4 as illustrated in FIG. 15. In such a case, the twisted groove 4 is formed continuously on an entire body and the web corresponds with a circle represented by W1.

Figure 16:
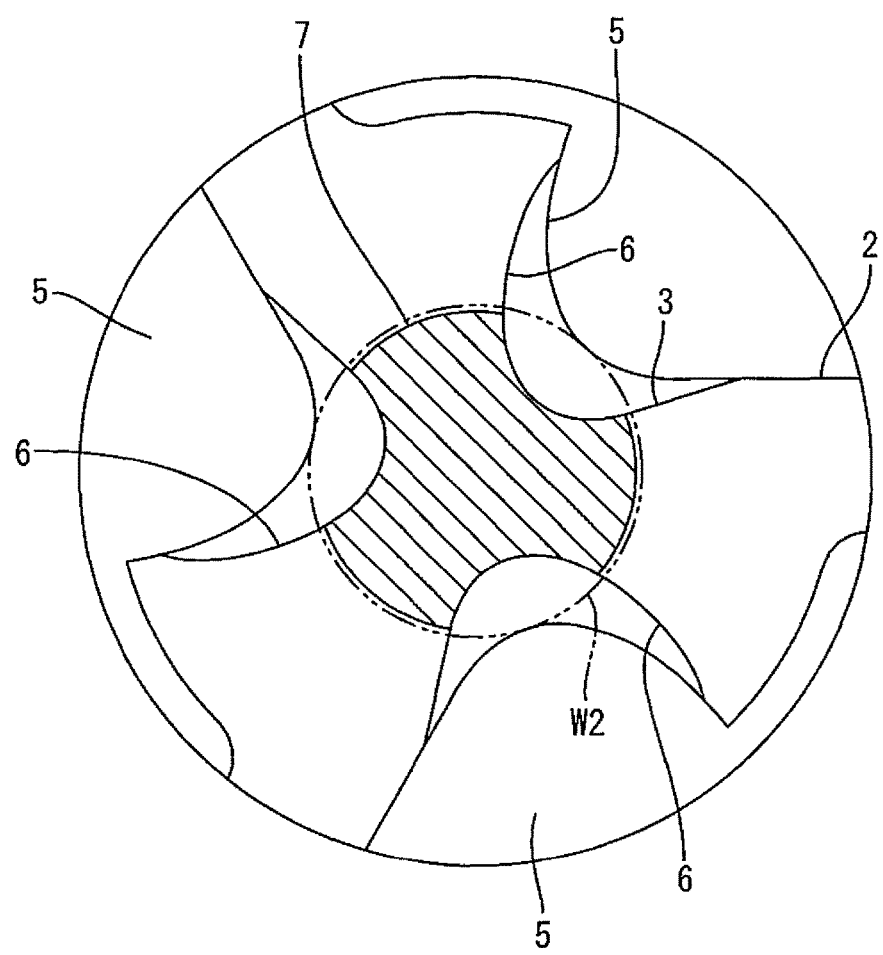
FIG. 16 is a cross-sectional view illustrating a web of the drill compared to the first embodiment (second embodiment).

In the drill of the second embodiment including two kinds of main cutting edges including the first main cutting edge 2 and the second main cutting edge 3, as illustrated in FIG. 16, the first main cutting edge 2 is formed as a result of forming the main twisted groove 5 in an entire portion of the body and the second main cutting edge 3 is formed as a result of forming an auxiliary twisted groove 6 on a distal end portion of the body. The outer peripheral surface 7 of the pilot shaft portion is cut by forming the auxiliary twisted groove 6 and therefore, the main twisted groove 4 does not necessarily have a depth into the outer peripheral surface 7 of the pilot shaft portion. As a result, the web W2 of the body can be a circle greater than W1 in FIG. 15. The auxiliary twisted groove 6 forming the second main edge 3 is twisted at a twist angle closer to that of the main twisted groove 4 and the second main cutting edge 3 also has a rake angle. Therefore, the cutting performance is not deteriorated with an increased web.

A ratio of the first main cutting edge 2 and the second main cutting edge 3 in length thereof can be determined with considering required cutting performance and durability. It is preferable that the ratio of the length of the second main cutting edge 3 to the total length of the first cutting edge 2 and the second cutting edge 3 is 20% to 80%. Accordingly, the properties of the edges are balanced. Especially, the ratio is most preferably from 40% to 60%.

The over-center amount B of the second main cutting edge 3 is preferably from 0 to a half of the over-center amount A of the first main cutting edge. The cutting performance of the second main cutting edge is maximum if the over-center amount B is 0. The over-center amount is preferably adjusted to correspond with a kind of an object to be cut. If the over-center amount B of the second main cutting edge 3 is greater than a half of the over-center amount of the first main cutting edge, the cutting resistance is less likely to be reduced and less effect is obtained from the formation of the auxiliary twisted groove.

Next, the second embodiment will be described in detail. The drill of this embodiment is manufactured by cutting a round bar made of steel or hard metal alloy similar to the first embodiment, and includes the shank 10 and the body 20 that is continuous from the shank 10. The drill according to the second embodiment is illustrated in FIGS. 17 to 20. Portions same as those in the first embodiments will be described with reference to the drawings and symbols same as in the first embodiment.

As illustrated in FIG. 6, the body 20 has the outer peripheral surface 21 having the outer diameter D (for example, 7.8 mm) and the distal end tapered surfaces 25 having a certain distal end angle α. The pilot shaft portion 30 projects from the distal end tapered surfaces 25 of the body 20 and is on the distal end of the body 20. The pilot shaft portion 30 and the body 20 are concentric. As illustrated in FIG. 6, the pilot shaft portion 30 includes the shaft main body portion 31, the distal end flat surface 32, and the distal end tapered surfaces 33. The shaft main body portion 31 has a right circular cylindrical shape having an outer peripheral surface of the outer diameter d and has a basal end portion that is integrally continuous from the distal end tapered surfaces 25 of the body 20. The distal end flat surface 32 is at a distal end of the shaft main body portion 31. The distal end tapered surfaces 33 are between the outer peripheral surface of the shaft main body portion 31 and the distal end flat surface 32. The distal end tapered surfaces 33 have a distal end angle β (see FIG. 6) that is 90 degrees in this embodiment. The distal end angle β may be preferably 60 degrees or more with considering cutting performance. The distal end angle β may be preferably set substantially same as the distal end angle α of the distal end tapered surfaces 25 for facilitating production of the drill.

The body 20 includes an odd number of, for example three, twisted grooves 22 on an outer peripheral surface thereof with a certain lead (for example, 42 mm), a twisted angle (for example, 30 degrees), and a groove length (for example, 70 mm). Each of the distal end tapered surfaces 25 continues from the outer peripheral surface of the body 20 to the basal end portion of the shaft main body portion 31 of the pilot shaft portion 30. The distal end tapered surface 25 extends in a ring shape to surround the basal end portion of the shaft main body portion 31. The tapered surfaces 25 include three tapered surfaces 25 as a result of forming the twisted grooves 22. The tapered surfaces 25 have the certain distal end angle α (see FIG. 6) and are tapered toward the distal end. In this embodiment, the distal end angle α is 118 degrees, for example, however, it may be any appropriate value considering strength and cutting efficiency of the drill. Margins 24 are formed along the respective twisted grooves 22 and an outer diameter D of the body 20 is determined by the margins 24. The outer diameter D of the body 20 corresponds with an outermost peripheral surface of the body 20.

Figure 17:
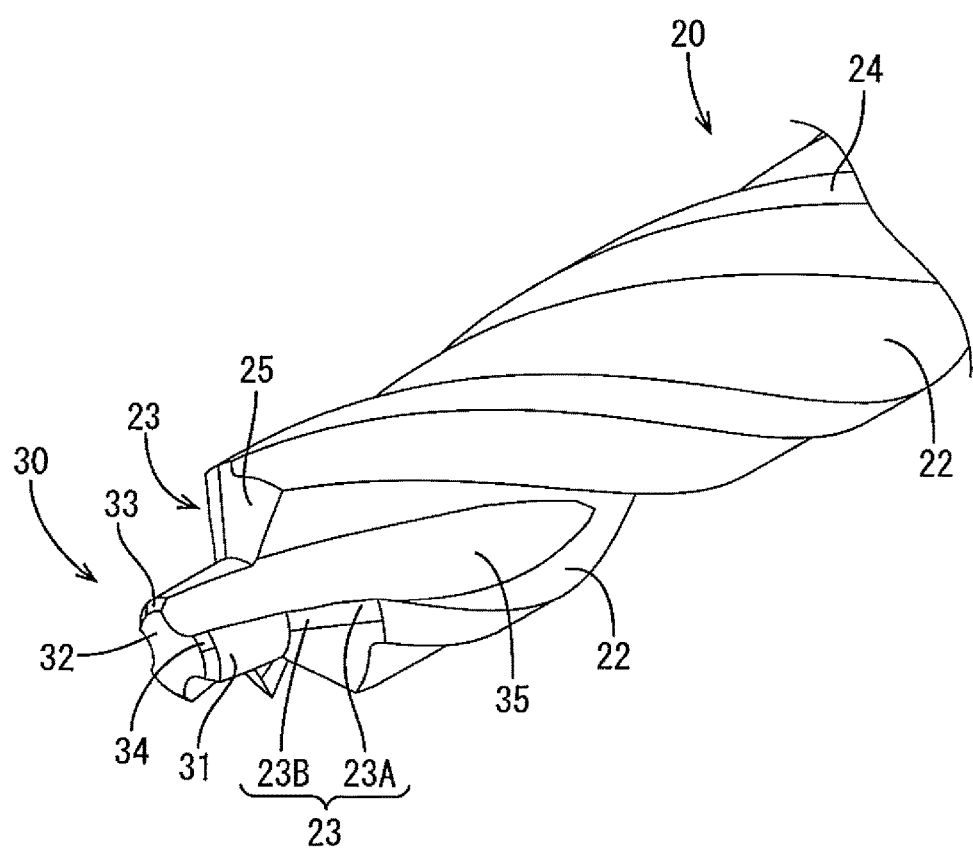
FIG. 17 is a perspective view of a distal end portion of a drill (second embodiment).
Figure 18:
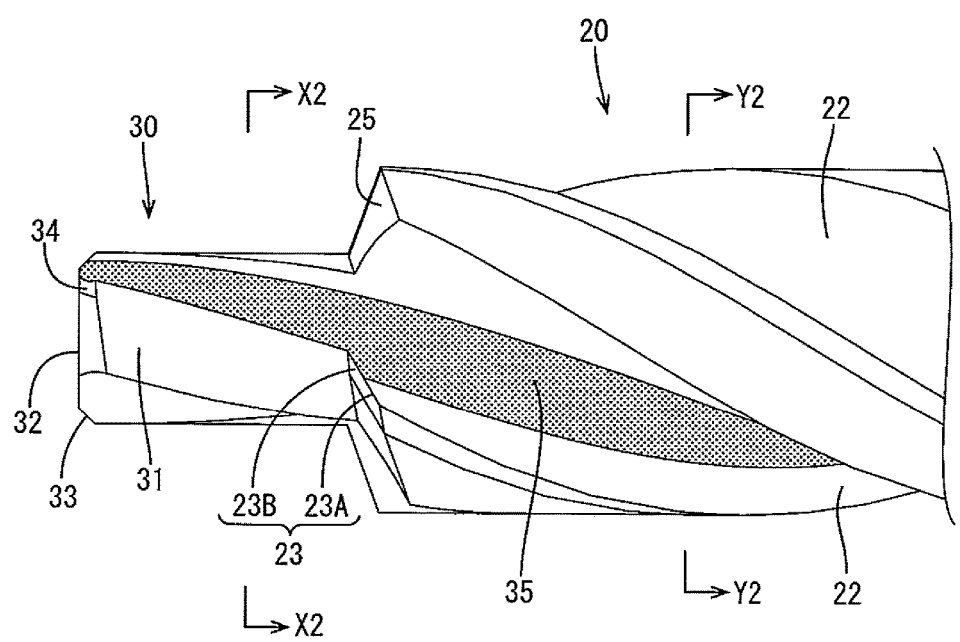
FIG. 18 is an enlarged side view of the distal end portion of the drill (second embodiment).
Figure 19:
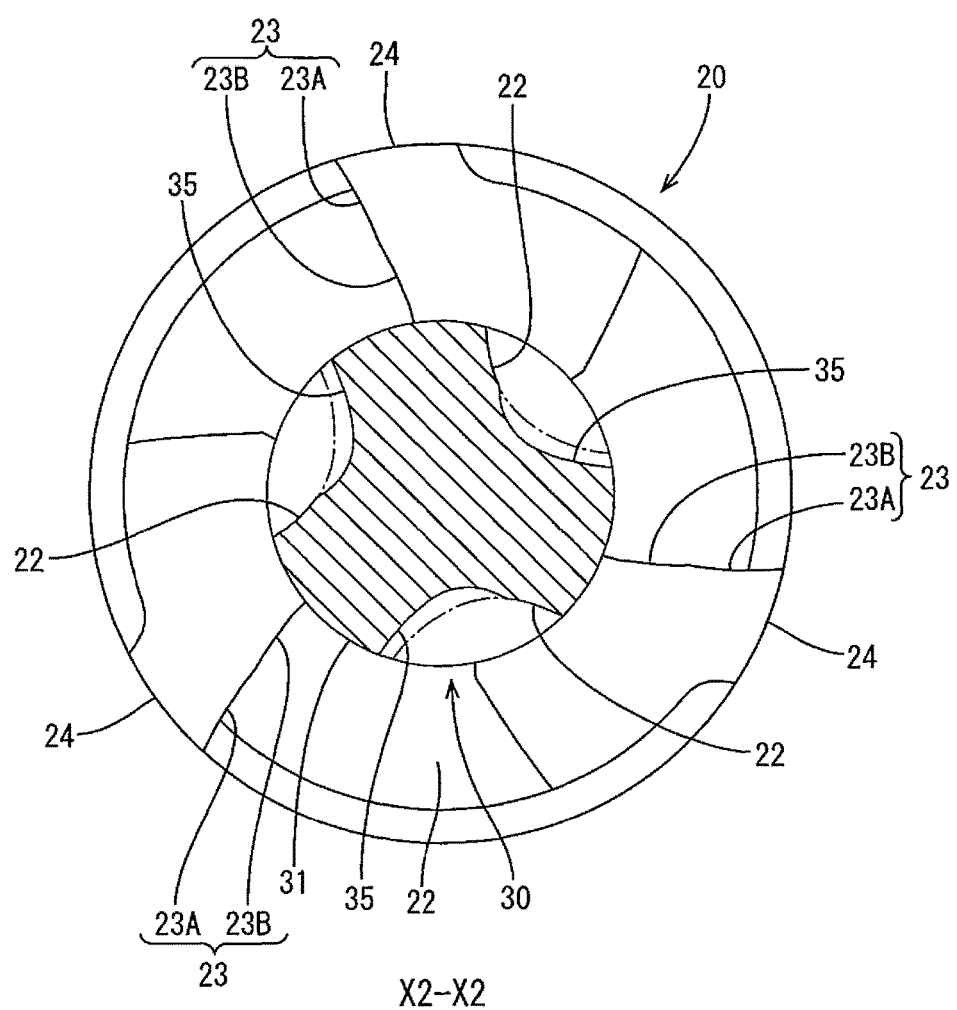
FIG. 19 is a cross-sectional view taken along line X2-X2 in FIG. 18 (second embodiment).
Figure 20:
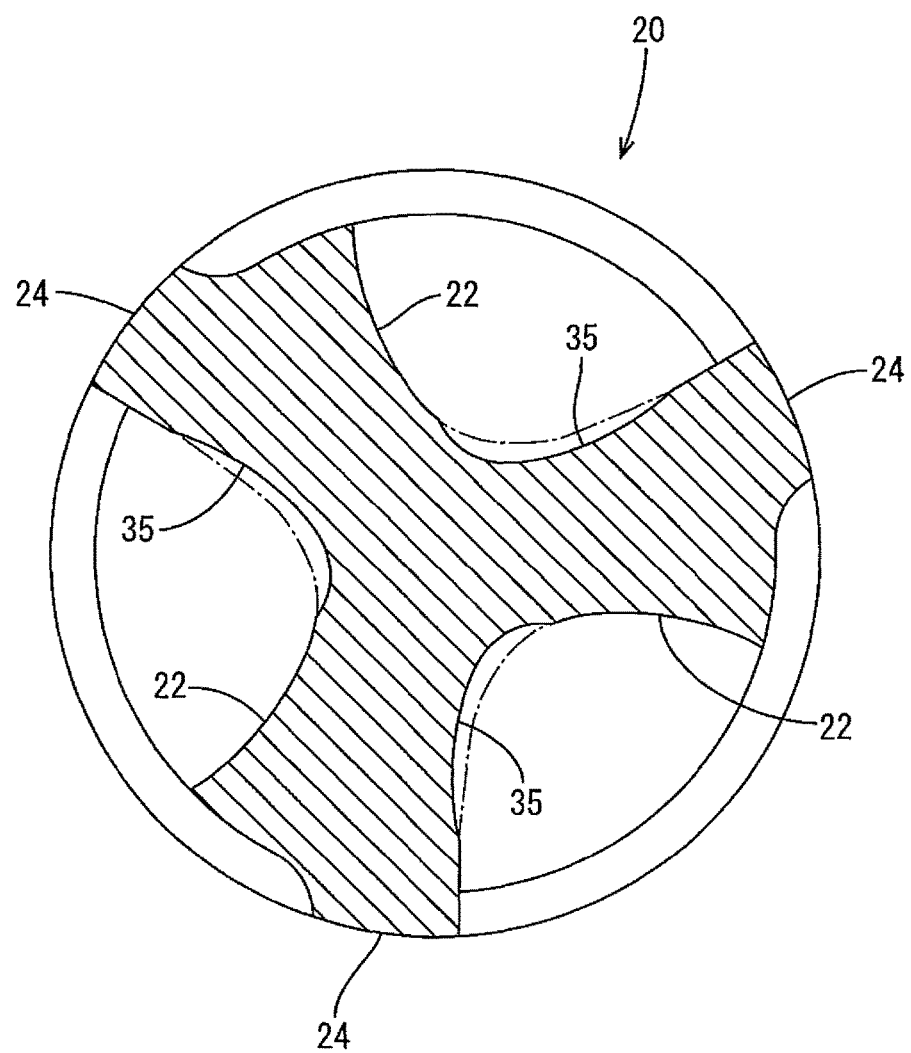
FIG. 20 is a cross-sectional view taken along line Y2-Y2 in FIG. 18 (second embodiment).

Each of the tapered surfaces 25 includes a main cutting edge 23 for each main twisted groove 22. Three main cutting edges 23 are formed on the tapered surfaces 25, respectively. As will be described later, the main cutting edge 23 differs from that in the first embodiment and includes two kinds of main cutting edges including a first main cutting edge 23A and a second main cutting edge 23B (see FIG. 17). The three main twisted grooves 22 extend over an entire area of the outer peripheral surface of the body 20 to the distal end tapered surface 25. The body 20 includes auxiliary twisted grooves 35 at the distal end side thereof. Each of the auxiliary twisted grooves 35 extends from a bottom portion of each main twisted groove 22 to the outer peripheral surface of the pilot shaft portion 30 and the auxiliary twisted grooves 35 are obtained by cutting the corresponding portions of the main twisted groove 22 and the pilot shaft portion 30. Each of the auxiliary twisted grooves 35 has a certain length and a certain depth. In FIG. 18, the corresponding portions where the auxiliary grooves 35 are formed are shaded to clearly illustrate them. In FIGS. 19 and 20, the portions of the bottom portions of the main twisted grooves 22 to be cut off by forming of the auxiliary grooves 35 are illustrated by dashed-dotted lines.

By forming the auxiliary grooves 35, the main cutting edge 23 portions are cut. As a result, each of the main cutting edges 23 includes the first main cutting edge 23A and the second main cutting edge 23B. The first main cutting edge 23A is formed via a cutting process of forming the main twisted groove 22 and the second main cutting edge 23B is formed via a cutting process of forming the auxiliary twisted groove 35. As illustrated in FIGS. 17 and 18, the first main cutting edge 23A is on the outer peripheral side in the distal end tapered surface 23 of the body 30 and the second main cutting edge 23B is continuous from the first main cutting edge 23A and on the inner peripheral side in the distal end tapered surface 23.

Each of the main twisted grooves 22 has a twisted angle of 30 degrees and the auxiliary twisted groove 35 that is formed in the bottom portion of the main twisted groove 22 has a twisted angle substantially same as that of the main twisted groove 22. The first main cutting edge 23A has a rake angle of 30 degrees at an outermost periphery, and has a rake angle of approximately 22 degrees at a border between the first main cutting edge 23A and the second main cutting edge 23B (substantially a middle of the length of the main cutting edge 23). The second main cutting edge 23B has a rake angle of approximately 13 degrees at an inner periphery thereof. Thus, the rake angle of the cutting edge continuously varies. The over-center amount of the first main cutting edge 23A is 0.27 mm and the over-center amount of the second main cutting edge 23B is 0.05 mm, for example. Thus, the main cutting edge 23 includes two kinds of main cutting edges 23A, 23B having different over-center amounts as illustrated exaggeratingly in FIG. 14.

The outer peripheral surface of the pilot shaft portion 30 is also cut off by forming the auxiliary twisted grooves 35 and therefore, the distal end tapered surfaces 33 that are formed to surround outer periphery of the distal end flat surface 32 in a ring shape are defined in three distal end tapered surfaces 33 by auxiliary twisted grooves 35. The distal end tapered surfaces 33 of the pilot shaft portion 30 include three auxiliary cutting edges 34 that are adjacent to the respective auxiliary twisted grooves 35. Each of the auxiliary cutting edges 34 has a cutting margin of 0.3 mm, for example.

The drill of the second embodiment is used similarly to the drill of the first embodiment for preferably drilling a hole in overlapped plates and further, the cutting resistance is greatly reduced compared to the drill of the first embodiment.

Other Embodiments

The present specification may include the following embodiments.

(1) The distal end angle α of the body 20 and the distal end angle β of the pilot shaft portion 30 illustrated in the above embodiments are examples and may be angles different from the specific angles described before.

(2) In each of the above embodiments, the drill includes three edges but may include five edges. In the drill including an odd number of edges, an odd number of margins are provided evenly around an entire periphery and deflection is less likely to occur.

(3) The auxiliary twisted grooves 35 of the second embodiment may be formed as far as the second main cutting edges 23B are formed along the respective main twisted grooves 22 and length and depth of the auxiliary twisted groove 35 are not limited and the depth may be altered. It is desired that the auxiliary twisted groove 35 has a length and depth within a certain range with considering re-grinding that may be required when the drill abrasion occurs.

(4) In each of the above embodiments, the twisted angle of the twisted groove is 30 degrees, but not limited to. The twisted angle may be altered appropriately according to hardness of an object to be cut.

(5) In each of the above embodiments, a hole is drilled in overlapped plates. However, a workpiece is not limited to such overlapped plates. The drill of the present technology, which has high axial rigidity and less deflection, is effectively used for drilling a deep hole of 5 D or more. Rectilinearity of a hole is important when drilling such a deep hole.

EXPLANATION OF SYMBOLS

10: shank
20: body
22: twisted groove (main twisted groove)
23: main cutting edge
23A: first main cutting edge
23B: second main cutting edge
25: distal end tapered surface of the body
30: pilot shaft portion
31: shaft main body portion
32: distal end flat surface
33: distal end tapered surface of the pilot shaft portion
34: auxiliary cutting edge
35: auxiliary twisted groove
40: overlapped plates
41: single plate

The invention claimed is:
1. A method of drilling a hole in overlapped plates, the method comprising:
forming a prepared hole having a diameter in the overlapped plates, in a prepared hole forming process, with a two-edge drill;
separating the overlapped plates after the forming of the prepared hole and obtaining single pates such that burrs generated by the two-edge drill on a drill exit side surface of each of the overlapped plates, are removed in a burring process;

re-mounting the single plates such that the plates are again overlapped;

providing a drill having a body and a pilot shaft portion, the body of the drill having a distal end with a tapered surface and an odd number of main cutting edges formed at the tapered surface;

and expanding the prepared hole in the overlapped plates that have been re-mounted, by inserting the pilot shaft portion of the drill in the prepared hole and expanding the prepared hole with the odd number of the main cutting edges formed on the tapered surface of the body of the drill in a hole expansion process.

* * * * *